(12) United States Patent
Kumar

(10) Patent No.: US 11,227,046 B2
(45) Date of Patent: Jan. 18, 2022

(54) DYNAMIC RANDOMIZATION OF PASSWORD CHALLENGE

(71) Applicant: STMicroelectronics International N.V., Geneva (CH)

(72) Inventor: Dhulipalla Phaneendra Kumar, Noida (IN)

(73) Assignee: STMicroelectronics International N.V., Geneva (CH)

( * ) Notice: Subject to any disclaimer, the term of this patent is extended or adjusted under 35 U.S.C. 154(b) by 70 days.

(21) Appl. No.: 16/726,454

(22) Filed: Dec. 24, 2019

(65) Prior Publication Data

US 2021/0192040 A1    Jun. 24, 2021

(51) Int. Cl.
    *G06F 21/45* (2013.01)
    *G06F 21/31* (2013.01)

(52) U.S. Cl.
    CPC .............. *G06F 21/45* (2013.01); *G06F 21/31* (2013.01)

(58) Field of Classification Search
    CPC .......... G06F 21/45; G06F 21/31; G06F 21/62; G06F 21/36
    See application file for complete search history.

(56) References Cited

U.S. PATENT DOCUMENTS

| | | | |
|---|---|---|---|
| 8,375,225 B1 | 2/2013 | Ybarra | |
| 8,867,739 B2 | 10/2014 | Danger | |
| 9,152,805 B2 | 10/2015 | Yamashita | |
| 9,600,678 B1 * | 3/2017 | Alamuri | G06F 21/31 |
| 9,614,837 B2 * | 4/2017 | Archer | H04L 63/083 |
| 10,540,492 B1 * | 1/2020 | Norris, III | G06F 21/36 |
| 2003/0172029 A1 | 9/2003 | Moitrel et al. | |
| 2003/0229598 A1 | 12/2003 | de Jong | |
| 2007/0299894 A1 | 12/2007 | Muraoka | |
| 2009/0241201 A1 * | 9/2009 | Wootton | G06F 21/31 726/28 |

(Continued)

FOREIGN PATENT DOCUMENTS

EP    3021226 A1    5/2016

OTHER PUBLICATIONS

Atmel: "CryptoCompanion(tm) Chip for CryptoMemory and CryptoRF," AT88SC018, 5277C-CryptoCompanion, Sep. 2009.

(Continued)

*Primary Examiner* — Tongoc Tran
(74) *Attorney, Agent, or Firm* — Crowe & Dunlevy

(57) ABSTRACT

Disclosed herein is a method of performing a password challenge in an embedded system. The method includes receiving a password, scrambling the sub-words of the password pursuant to scramble control codes, retrieving a verification word, scrambling the sub-words of the verification word pursuant to the scramble control codes, and comparing the scrambled sub-words of the password to the scrambled sub-words of the verification word. Access to a secure resource is granted if the scrambled sub-words of the password match the scrambled sub-words of the verification word. The scramble control codes cause random reordering of the sub-words of the password and sub-words of the verification word in a same fashion, and insertion of random delays between the comparison of different sub-words of the password to corresponding sub-words of the verification word.

18 Claims, 6 Drawing Sheets

(56) References Cited

U.S. PATENT DOCUMENTS

2013/0262880 A1 10/2013 Pong et al.
2016/0283744 A1* 9/2016 Dawson .................. G06F 21/45

OTHER PUBLICATIONS

Waksman, Adam, et al: "Silencing Hardware Backdoors," May 22, 2011, ___ pages.
EPO Search Report and Written Opinion for co-pending EP Appl. No. 20214436.6 dated May 6, 2021 (5 pages).

* cited by examiner

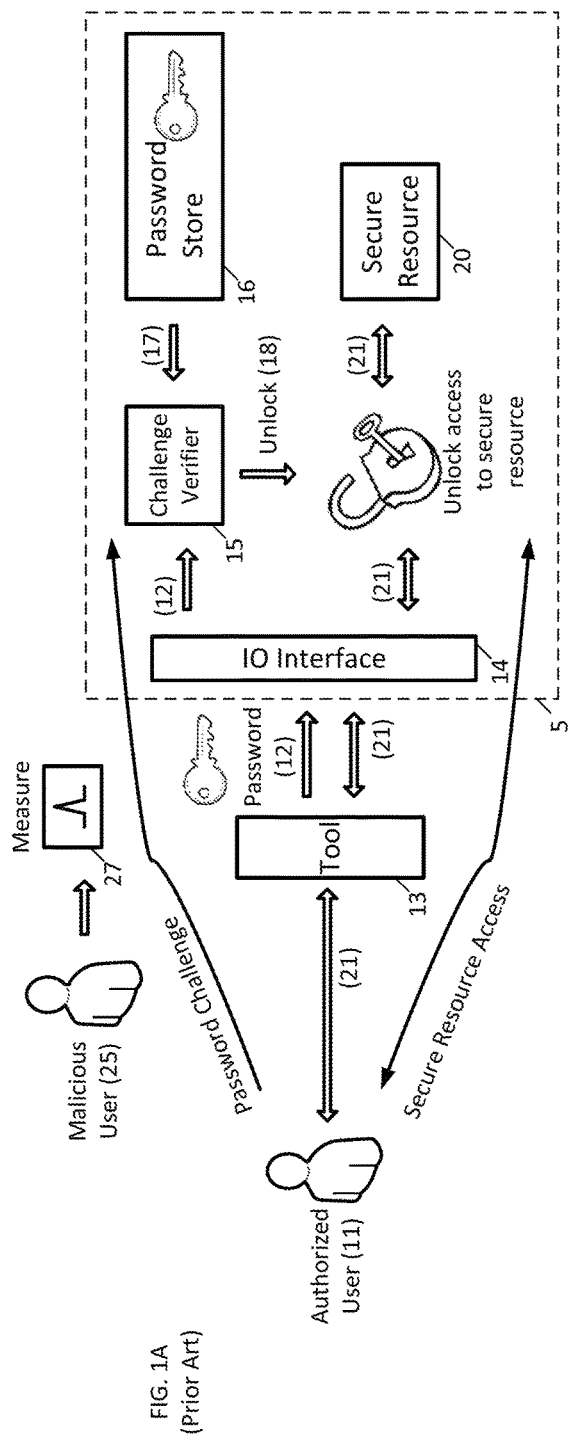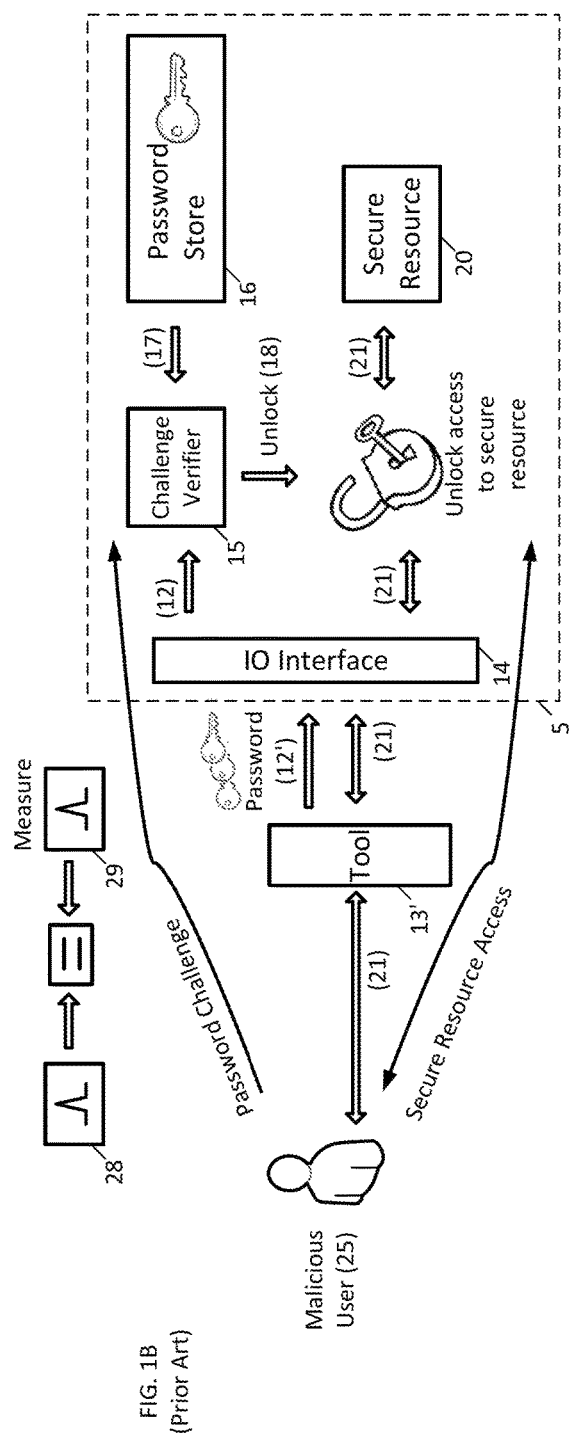

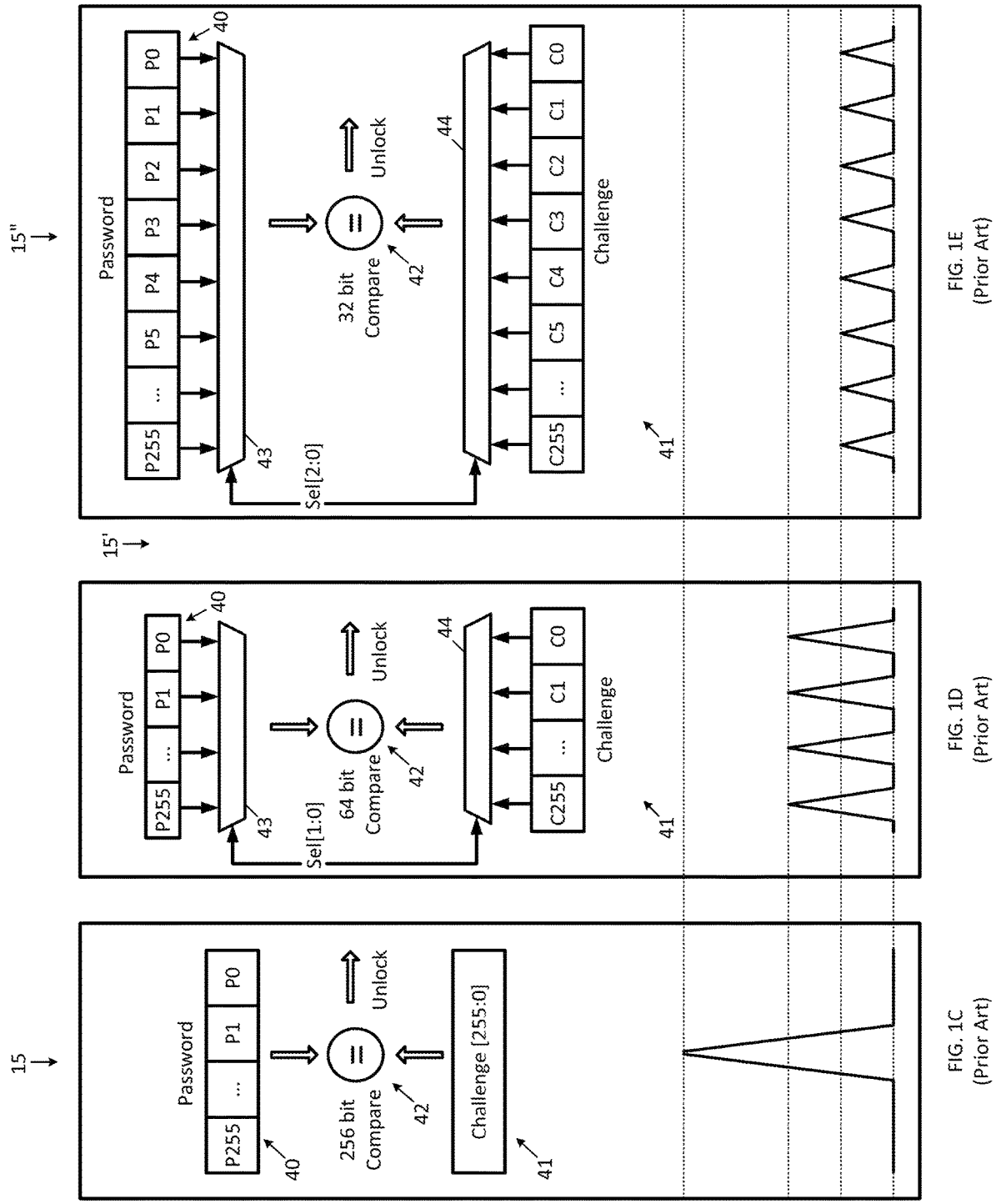

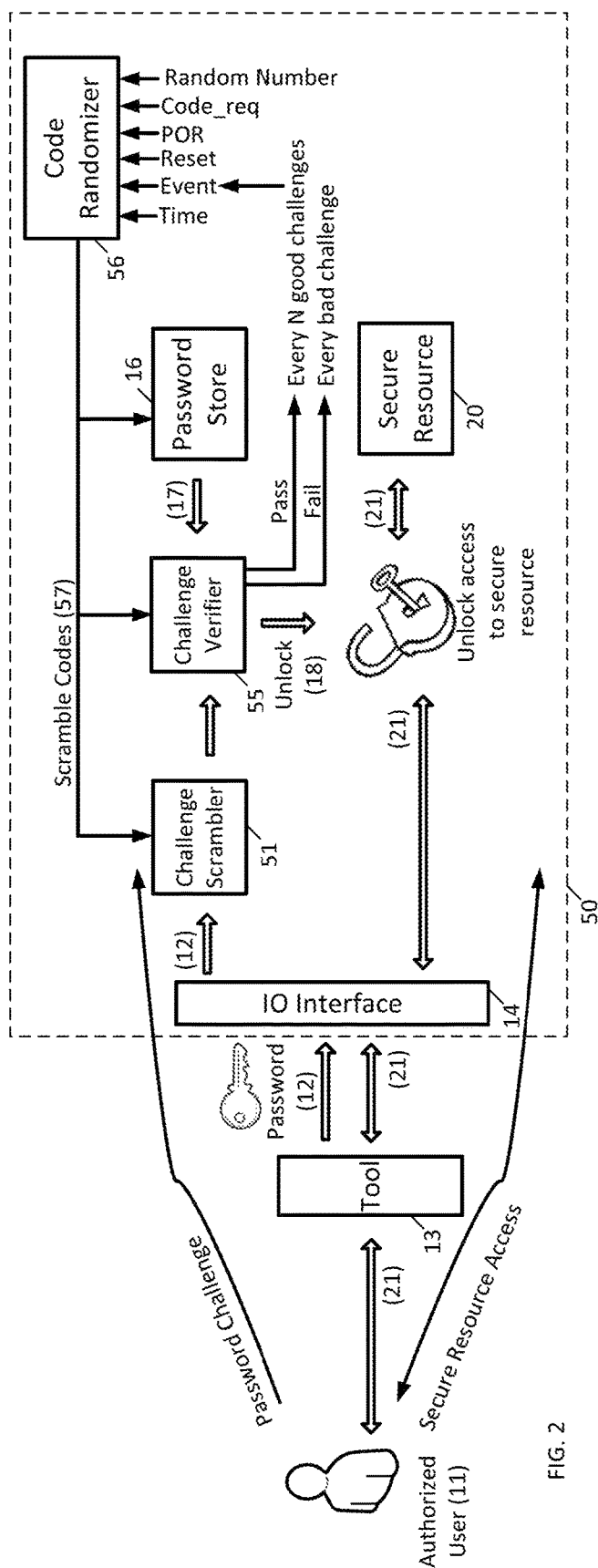
FIG. 2
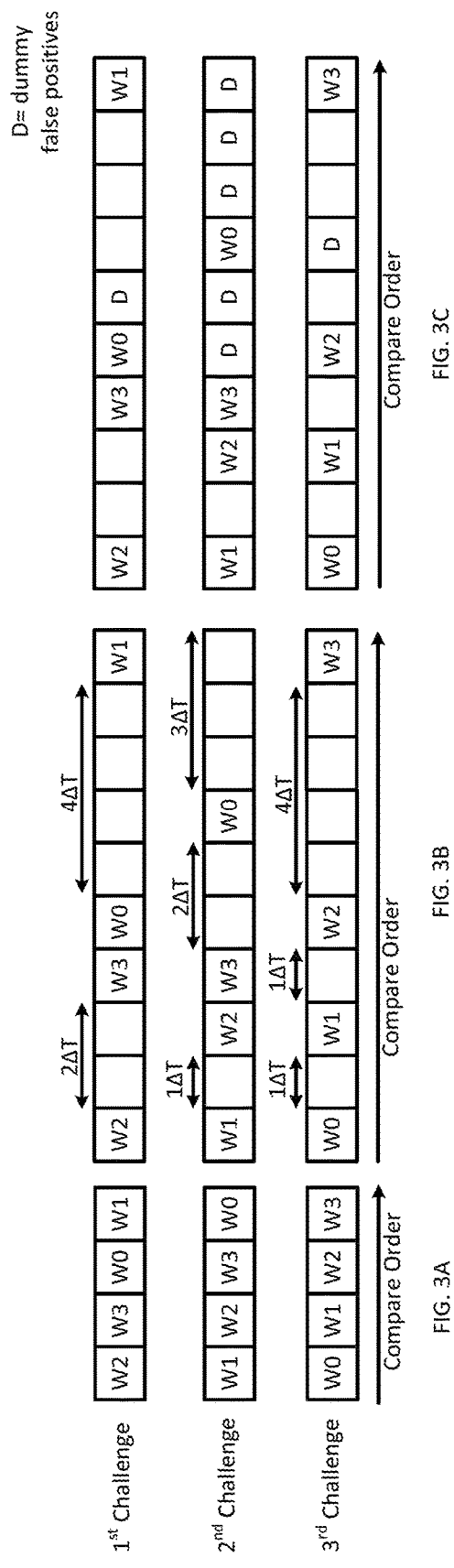
FIG. 3A
FIG. 3B
FIG. 3C

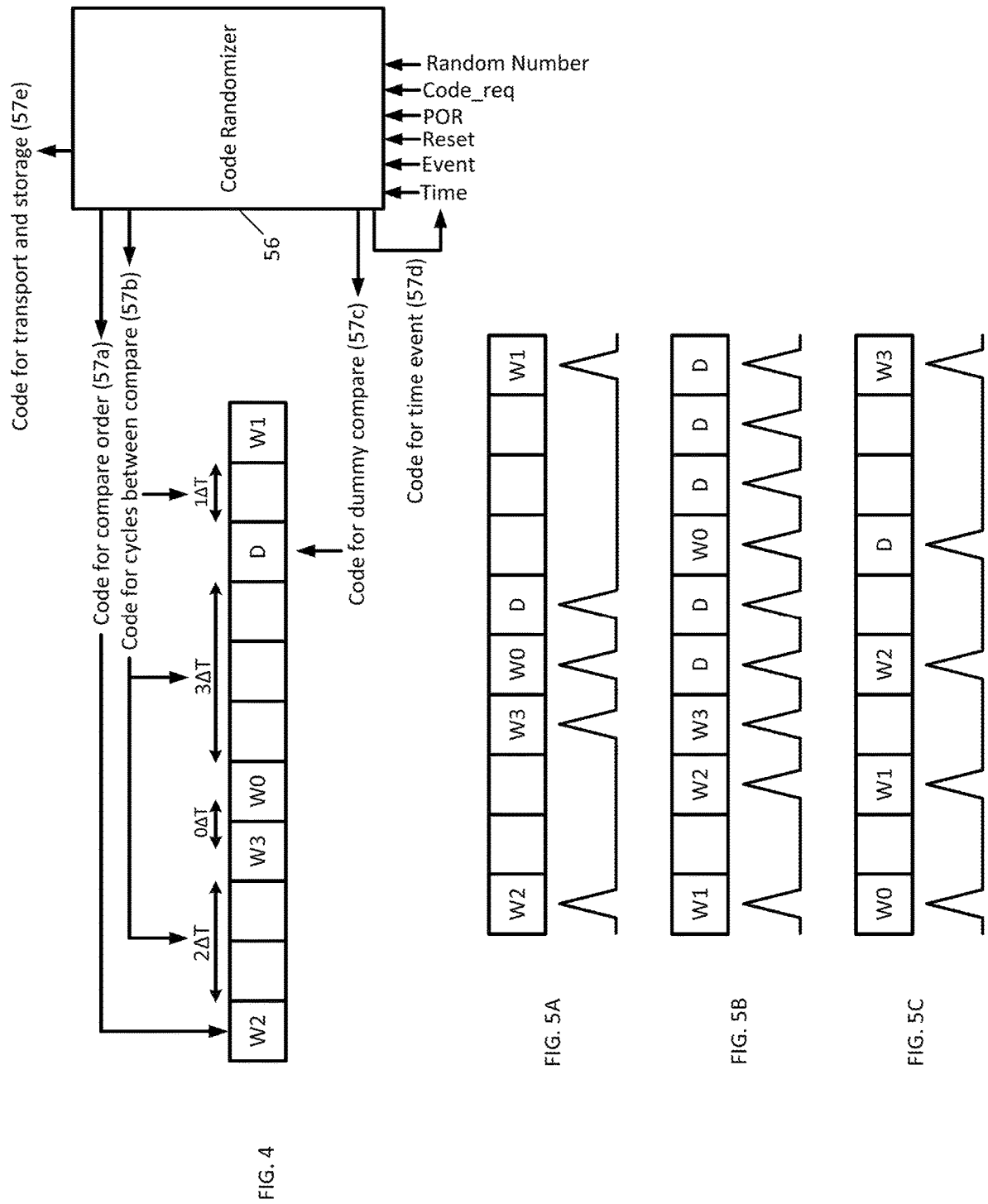

DYNAMIC RANDOMIZATION OF PASSWORD CHALLENGE

TECHNICAL FIELD

This application is directed to the field of security applications and, in particular, to a technique for the dynamic randomization of password challenges across chips so as to reduce the possibility of malicious hacks.

BACKGROUND

Shown in FIGS. 1A-1E are process flow diagrams illustrating the susceptibility of a typical password challenge by an embedded system 5, such as a system on a chip, to a hack performed by a malicious user 25.

Beginning with FIG. 1A, an authorized user 11 requests access to the embedded system 5 via a tool 13 associated with the authorized user 11. At this time, the embedded system 5 initiates a password challenge process by an IO interface 14 of the embedded system 5 receiving a password 12 from the tool 13. The IO interface 14 passes the password 12 to a challenge verifier 15. The challenge verifier 15 retrieves a verification word 17 from a password store 16, and compares the password 12 to the verification word 17. If the password 12 matches the verification word 17, the challenge verifier 15 generates an unlock command 18 which unlocks access to a secure resource 20. At this point, the authorized user 11 has been granted access to the secure resource 20, and may read secure data 21 from and/or write secure data 21 to the secure resource 20. Note that the password 12 provided by the tool 13 changes at each power on reset, as does the verification word 17. Also note that the mechanism used to generate the password 12 and verification word 17 remains the same at each power on reset, and remains the same across different ones of the same model of embedded system 5.

The concern with this process flow is that a malicious user 25 may measure signal pulses or spikes 27 that occur during this password challenge process shown in FIG. 1A and, in particular, may measure this over a range of multiple different embedded systems 5 to determine a single or series of pulses or spikes that can be considered to be a reference measurement 28. Then, as shown in FIG. 1B, the malicious user 25 may program a tool 13' to try a series of different passwords 12', while the malicious user 25 measures the resulting signal pulses or spikes 29 that occur. When the measured signal pulses or spikes 29 match the reference measurement 28, then the tool 13' will routinely generate a password 12' that passes the password challenge at each power on reset. At this point, the embedded system 5 is compromised.

Shown in FIG. 1C is a block diagram of the challenge verifier 15. Here, it can be seen that the password 12 received from the tool 13 is stored in a password register 40 in the challenger verifier block 15. The verification word 17 retrieved from the password store 16 is stored in a verifier register 41 in the challenger verifier block 15. A comparison circuit 42 compares the password 12 to the verification word 17 and unlocks access to the secure resource 20 if there is a match. Note here that both the password 12 and verification word 17 are 256 bits, and that the comparison circuit 42 performs a 256 bit compare. Therefore, a single pulse or spike (or single pattern of pulses or spikes) is generated by the 256 bit compare.

A block diagram of a variant of the challenger verifier block 15' is shown in FIG. 1D. Here, while the password 12 and verification word 17 are 256 bit, the compare performed is a 64 bit compare, multiple times. Therefore, a 256-to-64 multiplexer 43 passes 64 bits of the password 12 from the password register 40 to the comparison circuit 42 at a time (under control of a two bit selection signal Sel[1:0]), while a 256-to-64 multiplexer 44 passes 64 bits of the verification word 17 from the verifier register 41 to the comparison circuit 42 at a time (also under control of Sel[1:0]), so that individual 64 bit compares can be performed, with the comparison circuit 42 unlocking the access to the secure resource 20 if there is a match at each 64 bit compare. Therefore, compared to the single pulse or spike (or single pattern of pulses or spikes) generated when a 256 bit compare is performed (FIG. 1C), four pulses or spikes (or four patterns of pulses or spikes) are here generated by the four 64 bit compares.

A block diagram of a variant of the challenger verifier block 15" is shown in FIG. 1E. Here, while the password 12 and verification word 17 are 256 bit, the compare performed is a 32 bit compare, multiple times. Therefore, a 256-to-32 multiplexer 43 passes 32 bits of the password 12 from the password register 40 to the comparison circuit 42 at a time (under control of a three bit selection signal Sel[2:0]), while a 256-to-32 multiplexer 44 passes 32 bits of the verification word 17 from the verifier register 41 to the comparison circuit 42 at a time (also under control of Sel[2:0]), so that individual 32 bit compares can be performed, with the comparison circuit 42 unlocking the access to the secure resource 20 is there is a match at each 32 bit compare. Therefore, compared to the single pulse or spike (or single pattern of pulses or spikes) generated when a 256 bit compare is performed (FIG. 1C), eight pulses or spikes (or eight patterns of pulses or spikes) are here generated by the eight 32 bit compares.

While this use the process for multiple 64 or 32 bit compares may complicate the measuring to be performed by the malicious user 25, the mechanism used to generate the password 12 and verification word 17 remains the same at each power on reset, and remains the same across different ones of the same model of embedded system 5, meaning that the malicious user 25 may still be able to successfully accomplish a hack.

Therefore, further development into password challenge process flows for embedded systems is required.

SUMMARY

Disclosed herein is a method of performing a password challenge in an embedded system. The method includes: receiving a password, the password being comprised of a plurality of sub-words; scrambling the sub-words of the password pursuant to scramble control codes; retrieving a verification word, the verification word being comprised of a plurality of sub-words; scrambling the sub-words of the verification word pursuant to the scramble control codes; and comparing the scrambled sub-words of the password to the scrambled sub-words of the verification word, and granting access to a secure resource if the scrambled sub-words of the password match the scrambled sub-words of the verification word. The scramble control codes cause: random reordering of the sub-words of the password and sub-words of the verification word in a same fashion; and insertion of random delays between the comparison of different sub-words of the password to corresponding sub-words of the verification word.

BRIEF DESCRIPTION OF THE DRAWINGS

FIG. 1A is a process flow diagram of a prior art password challenge technique implemented by a prior art embedded system, in which an authorized user is accessing the embedded system while a malicious user measures the embedded system.

FIG. 1B is a process flow diagram of the prior art password challenge technique of FIG. 1A, in which the malicious user utilizes the measurements taken of use of the authorized user to be able to program a malicious tool to be able to pass the password challenge.

FIG. 1C is a block diagram of the challenge verifier of FIGS. 1A-1B, configured to use a 256 bit compare to complete the password challenge.

FIG. 1D is a block diagram of the challenge verifier of FIGS. 1A-1B, configured to use a 64 bit compare to complete the password challenge.

FIG. 1E is a block diagram of the challenge verifier of FIGS. 1A-1B, configured to use a 32 bit compare to complete the password challenge.

FIG. 2 is a process flow diagram of a password challenge technique implemented by an embedded system described herein, in which both the password and verification word are dynamically randomized.

FIG. 3A is a diagram of 256 bit verification words of FIG. 2 divided into 64 bit sub-words, after a dynamic randomization of the order in which the 64 bit sub-words of the password and verification word are compared.

FIG. 3B is a diagram of the verification words of FIG. 3A, after a dynamic randomization of the time between the comparison of 64 bit sub-words of the password and verification word.

FIG. 3C is a diagram of the verification words of FIG. 3B after the insertion of dummy compare operations.

FIG. 4 is a diagram showing how the scramble codes of the code randomizer of FIG. 2 inform the challenge verifier how to perform the dynamic randomization of verification words shown in FIGS. 3B-3C.

FIGS. 5A-5C illustrate how measurement of the password challenge pursuant to the process flow diagram of FIG. 2 yields a different pattern each time, reducing possibility of a hack.

DETAILED DESCRIPTION

Figure 6:
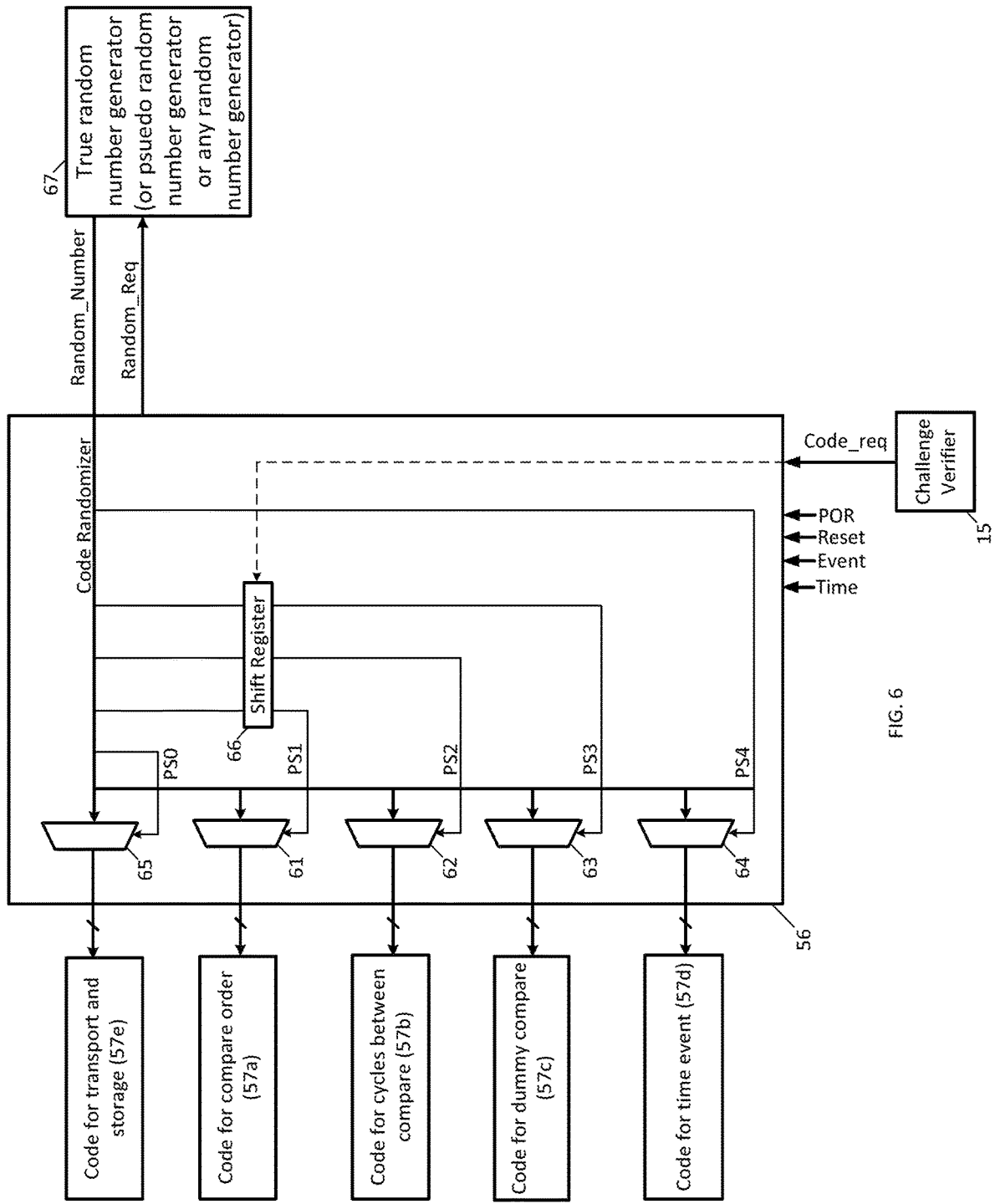
FIG. 6 is a block diagram of the code randomizer of FIG. 2.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Shown in FIG. 2 is a process flow diagram illustrating a password challenge by an embedded system 50 disclosed herein, such as a system on a chip.

An authorized user 11 requests access to the embedded system 50 via a tool 13 associated with the authorized user 11. At this time, the embedded system 50 initiates a password challenge process by an IO interface 14 of the embedded system 50 receiving a password 12 from the tool 13, or by the IO interface 14 sending a password request to the tool 13.

The IO interface 14 passes the password 12 through a challenge scrambler 51 to a challenge verifier block 55. The challenge scrambler 51 acts upon the password 12 according to the scramble codes 57 received from a code randomizer 56. The challenge verifier 55 receives a verification word 17 from a password store 16, and acts upon the verification word 17 according to the scramble codes 57. The challenge verifier 55 compares the password 12 as acted upon by the challenge scrambler 51 to the verification word 17 as acted upon by the challenge verifier 55, and generates an unlock command 18 which unlocks access to a secure resource 20 if a match is found. At this point, the authorized user 11 is allowed to access information from, and/or write information to, the secure resource 20.

The password 12 and verification word 17 each have a same number of bits, such as 256 (but may be longer or shorter), divided into sub-words (that collectively comprise the respective password or verification word). The sub-words are, for example, 64 bit (but may be longer or shorter). When performing a comparison between the password 12 and verification word 17, as explained, the challenge verifier 55 compares sub-words of the password 12 to corresponding sub-words of the verification word 17, and generates an unlock command 18 which unlocks access to a secure resource 20 if each sub-word matches.

The scramble codes 57 inform the challenge scrambler 51 and challenge verifier 55 how to randomize the order of the sub-words of the password 12 and verification word 17. The scramble codes also inform the challenge verifier how to randomize the time delay (i.e. how many cycles to insert) between subsequent sub-word comparisons and how to randomize the insertion of dummy compares (such as dummy false positive comparisons) into the password challenge.

These actions are now described in detail. FIG. 3A is a diagram showing how, with each password challenge iteration, the order of sub-word comparison is randomized. For example, assume that the password 12 and verification word 17 are each comprised of four sub-words W0-W4. During a first password challenge iteration, the challenge scrambler 51, pursuant to the scramble codes 57, rearranges the order of the sub-words of the password 12 to be W2, W3, W0, W1. Likewise, the challenge verifier 55, also pursuant to the scramble codes 57, rearranges the order of the sub-words of the verification word 17 to be W2, W3, W0, W1.

FIG. 3B is a diagram showing how, with each password challenge iteration, the time delay between subsequent word comparisons is randomized. Here, for example, during a first password challenge iteration, the challenge verifier 55, pursuant to the scramble codes 57: inserts a delay of 2ΔT between the comparison of W2 of the password 12 to W2 of the verification word 17, and the comparison of W3 of the password 12 to W3 of the verification word 17; does not insert a delay between the comparison of W3 of the password 12 to W3 of the verification word 17, and the comparison of W0 of the password 12 to W0 of the verification word 17; and inserts a delay of 4ΔT between the comparison of W0 of the password 12 to W0 of the verification word 17, and the comparison of W1 of the password 12 to W1 of the verification word 17.

FIG. 3C is a diagram showing how, with each password challenge iteration, dummy comparisons (potentially false positive comparisons) are randomly inserted between compares of the sub-words of the password 12 to the verification word 17. Here, for example, during a first password challenge iteration, the challenge verifier 55, pursuant to the scramble codes 57, inserts a dummy comparison immediately after the comparison of W0 of the password 12 to W0 of the verification word 17.

Shown in FIG. 4 is how the scramble codes 57 generated by the code randomizer 57 include a code for compare order 57a (informing the challenge scrambler 51 and challenge verifier 55 in what order to re-order the sub-words of the password 12 and verification word 17), a code for cycles between compare 57b (informing the challenge verifier 55 between which sub-word comparisons to insert delays, and how long those delays should be), a code for dummy compare 57c (informing the challenge verifier 55 between which sub-word comparisons to insert dummy comparisons), and optionally a code for a time event 57d that informs the code randomizer 56 itself when to generate new scramble codes 57. The time event may be periodic. The scramble codes are generated based upon a random number received by the code randomizer 56. The random number itself may be re-generated (to yield a new random number) at each power on reset, and/or when a given event occurs, and/or when a hard reset occurs, and/or when a power-up occurs, and/or in response to the code for the time event 57d, and/or at each password challenge.

Note that the code randomizer 56 generates new scramble codes 57 at each power on reset, and/or when a given event occurs (such as any operation performed on the password store 16), and/or when a hard reset occurs, and/or when a power-up occurs, and/or in response to the code for the time event 57d, and/or at each password challenge. The event may also be upon every failed comparison (lack of a match) between the password 12 and the verification word 17, or may be upon every N successful comparisons (match occurred) between different passwords 12 and corresponding verification words 17, for example.

The code randomizer 56 may receive a control signal Code_req that informs the code randomizer 56 which scramble codes 57 to generate (for example 57a-57c but not 57d).

Referring back to FIGS. 3A-3B, it can be seen that the randomization is not only within each password challenge, but across password challenges when new scramble codes 57 are generated.

Therefore, for example, at a second challenge, the order of word comparison between the password 12 and the verification word 17 is W1, W2, W3, W0; a delay of 1ΔT is inserted between the comparisons of W1 and W2 while a delay of 2ΔT is inserted between the comparisons of W3 and W0, and a delay of 3ΔT is inserted after the comparisons of W0; two dummy comparisons are inserted between the comparisons of W3 and W0, and three dummy comparisons are inserted after the comparisons of W0.

At a third challenge, the order of word comparison between the password 12 and the verification word 17 is W0, W1, W2, W3; a delay of 1ΔT is inserted between the comparisons of W0 and W1, a delay of 1ΔT is inserted between the comparisons of W1 and W2, and a delay of 4ΔT is inserted between the comparisons of W2 and W3; and a dummy comparison is inserted after a delay of 1ΔT after the comparison of W2.

The effect of this randomization within each password challenge, and across password challenges, can be seen in FIGS. 5A-5B, where measuring signal pulses or spikes yields a different result for each password challenge. Still further, it should be appreciated that since the scramble codes 57 are generated based upon a random number, this randomization is actually not only within each password challenge and across password challenges, but also across embedded systems 50. This means that measurement of a single embedded system 50 will not yield useful information to a malicious user, but also that measurement of multiple such embedded systems 50 will not yield useful information to a malicious user. Therefore, implementation of the password challenge process flow described above improves the functionality of the embedded device 50 by providing the embedded device 50 with additional protection against hacking.

Further details of the generation of the scramble codes 57 by the code randomizer 56 can be seen in FIG. 6. A digital random number Random Number is received by the code randomizer 56 from a random number generator 67 (which may also be a true random number generator, or a pseudo random number generator, or any random number generator) in response to the code randomizer 56 outputting the random number required signal Random_Req to the random number generator 67. The code randomizer 56 generates the random number required signal Random_Req in response to a power on reset (POR), a hard reset (power on), occurrence of a specific event (such as performance of any operation on the password store 16, or upon every failed comparison between the password 12 and the verification word 17, or upon every N successful comparisons between different passwords 12 and corresponding verification words 17, or may be upon every comparison regardless of output, for example), or at a specific time (such as periodically or aperiodically during operation), or in response to the code required signal Code_req explained above.

The full digital random number is fed to multiplexers 61-65. The multiplexers 61-65 are respectively switched by individual bits or groups of bits PS0-PS4 of the digital random word Random_Number to select different bit groups of the digital random number Random Number to pass as the scramble codes 57a-57e. Note that the digital random number Random Number is a multi-bit number and that the multiplexers 61-65 each output 57a-57e as multi-bit numbers. Note that a shift register 66 receives the digital random number Random Number and from it, generates PS1-PS3. Note that the bits PS1-PS3 may be re-selected by the shift register 66 between different generations of the digital random number, in response to receipt of the Code_req signal.

Figure 7:
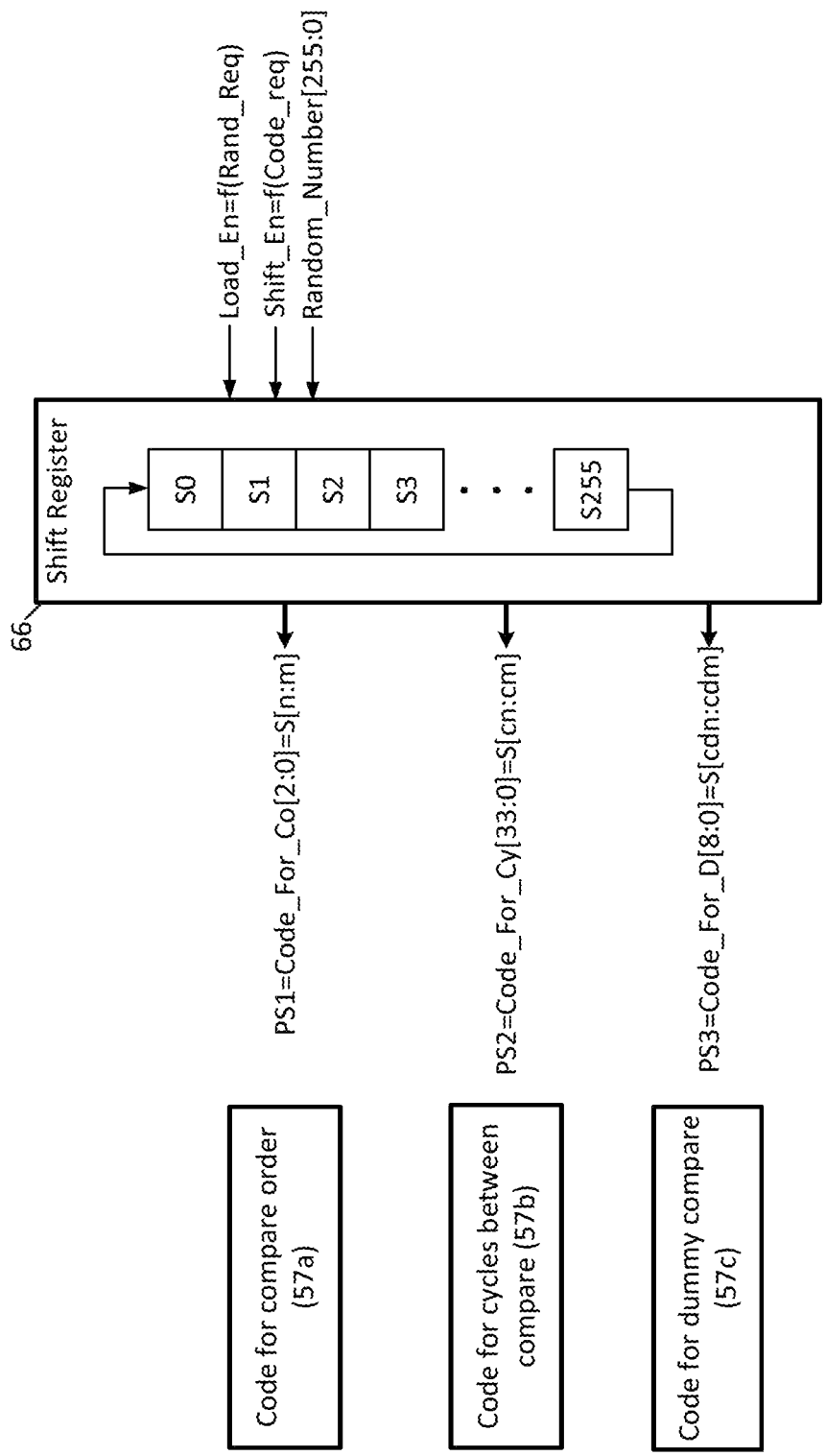
FIG. 7 is a block diagram of the shift register of the code randomizer of FIG. 6.

Further details of the shift register 66 may be found in FIG. 7. As can be seen, the shift register 66 interprets the Random_Req signal as a load enable signal (meaning that the shift register is re-loaded with the current digital random number Random Number, which here is a 256 bit number). The shift register 66 also interprets the Code_req signal as a shift enable signal Shift_En, meaning that the shift register 66 performs a shift of the random number by a given amount, with the shift being a circular shift such that the bits that would be shifted out of the shift register 66 are instead shifted back into the beginning of the shift register 66. For example, if bit 255 (referred to as S255) is shifted, it will be shifted around to be bit 0 (referred to as S0).

This shift register 66 generates PS1, which is a 3 bit code for causing the multiplexer 61 to select the proper bits of the digital random number Random_Number, referred to here at Code_For_Co[2:0], for generating the code for compare order 57a. As such, PS1 here is equal to S[n:m], with S[255:0] representing the digital random number Random_Number.

The shift register 66 also generates PS2, which is a 34 bit code for selecting the proper bits of the digital random number Random_Number, referred to here at Code_For_Cy[33:0], for generating the code for cycles between compare 57b. As such, PS2 here is equal to S[cn:cm].

The shift register 66 also generates PS3, which is a 9 bit code for selecting the proper bits of the digital random number Random Number, referred to here at Code_For_D [33:0], for generating the code for inserting dummy compares 57c. As such, PS3 here is equal to S[cdn:cdm].

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of performing a password challenge in an embedded system, the method comprising:
   receiving a password, the password being comprised of sub-words;
   scrambling the plurality of sub-words of the password pursuant to scramble control codes;
   retrieving a verification word, the verification word being comprised of sub-words;
   scrambling the plurality of sub-words of the verification word pursuant to the scramble control codes; and
   comparing the scrambled sub-words of the password to the scrambled sub-words of the verification word, and granting access to a secure resource if the scrambled sub-words of the password match the scrambled sub-words of the verification word;
   wherein the scramble control codes cause, for scrambling of sub-words of the password and the scrambling of the sub-words of the verification word:
      random reordering of the sub-words of the password and the sub-words of the verification word in a same fashion; and
      insertion of random delays between the comparison of different sub-words of the password to corresponding sub-words of the verification word.

2. The method of claim 1, wherein the scramble control codes further cause, for scrambling of the sub-words of the password and the scrambling of the sub-words of the verification word, insertion of random dummy comparisons between the comparison of different sub-words of the password to corresponding sub-words of the verification word.

3. The method of claim 1, wherein the scramble control codes further cause, for scrambling of the sub-words of the password and the scrambling of the sub-words of the verification word, insertion of random dummy comparisons during at least one of the random delays.

4. The method of claim 1, wherein the scramble control codes are changed at each power on reset of the embedded system.

5. The method of claim 1, wherein the scramble control codes are changed each time the comparison between the scrambled sub-words of the password and the scrambled sub-words of the verification word fails to indicate a match.

6. The method of claim 1, wherein the scramble control codes are changed after a given number of times the comparison between the scrambled sub-words of the password and the scrambled sub-words of the verification word indicates a match.

7. The method of claim 1, wherein the scramble control codes are generated from a random number.

8. The method of claim 1, wherein the random delays are based upon the scramble control codes.

9. A system for performing a password challenge, the system comprising:
   an input/output interface configured to receive a password, the password being comprised of sub-words;
   a challenge scrambler configured to receive the password from the input/output interface, receive a word order scramble control code, and reorder the sub-words of the password based upon the word order scramble control code;
   a challenge verifier configured to:
      retrieve a verification word from a password store, the verification word being comprised of sub-words;
      receive the word order scramble control code;
      receive a cycles-between-comparison scramble control code;
      reorder the sub-words of the verification word based upon the word order scramble control code;
      compare the sub-words of the password to the sub-words of the verification word, and insert a delay between at least one comparison of a given sub-word of the password to a corresponding sub-word of the verification word based upon the cycles-between-comparison scramble control code; and
      if each sub-word of the password matches each corresponding sub-word of the verification word, generate an unlock command; and
   a secure resource configured to grant access to data stored therein in response to receipt of the unlock command.

10. The system of claim 9, wherein the challenge verifier is further configured to receive a dummy compare scramble control code, and to perform a dummy comparison between at least one comparison of a given sub-word of the password and a corresponding sub-word of the verification word based upon the dummy compare scramble control code.

11. The system of claim 10, wherein the at least one comparison of the given sub-word of the password to the corresponding sub-word of the verification word between which the dummy comparison is performed is selected based upon the dummy compare scramble control code.

12. The system of claim 9, wherein a length of the delay is based upon the cycles-between-comparison scramble control code.

13. The system of claim 9, wherein the at least one comparison of the given sub-word of the password to the corresponding sub-word of the verification word between which the delay is inserted is selected based upon the cycles-between-comparison scramble control code.

14. The system of claim 9, further comprising a code randomizer configured to generate the word order scramble control code and the cycles-between-comparison scramble control code.

15. The system of claim 14, wherein the code randomizer changes the word order scramble control code and the cycles-between-comparison scramble control code at each power on reset of the system.

16. The system of claim 14, wherein the code randomizer changes the word order scramble control code and the cycles-between-comparison scramble control code each time the comparison between the sub-words of the password and the sub-words of the verification word fails to indicate a match.

17. The system of claim 14, wherein the code randomizer changes the word order scramble control code and the cycles-between-comparison scramble control code after a given number of times the comparison between the sub-words of the password and the sub-words of the verification word indicates a match.

18. The system of claim 14, wherein the code randomizer generates the word order scramble control code and the cycles-between-comparison scramble control code from a random number.

* * * * *

UNITED STATES PATENT AND TRADEMARK OFFICE
CERTIFICATE OF CORRECTION

PATENT NO. : 11,227,046 B2
APPLICATION NO. : 16/726454
DATED : January 18, 2022
INVENTOR(S) : Dhulipalla Phaneendra Kumar It is certified that error appears in the above-identified patent and that said Letters Patent is hereby corrected as shown below:

In the Claims

At Column 7, Claim No. 1, the claim should read as follows:
1. A method of performing a password challenge in an embedded system, the method comprising:
    receiving a password, the password being comprised of a plurality of sub-words;
    scrambling the plurality of sub-words of the password pursuant to scramble control codes;
    retrieving a verification word, the verification word being comprised of a plurality of sub-words;
    scrambling the plurality of sub-words of the verification word pursuant to the scramble control codes; and
    comparing the scrambled sub-words of the password to the scrambled sub-words of the verification word, and granting access to a secure resource if the scrambled sub-words of the password match the scrambled sub-words of the verification word;
    wherein the scramble control codes cause:
        random reordering of the sub-words of the password and the sub-words of the verification word in a same fashion; and
        insertion of random delays between the comparison of different sub-words of the password to corresponding sub-words of the verification word.

At Column 7, Claim No. 2, the claim should read as follows:
2. The method of claim 1, wherein the scramble control codes further cause insertion of random dummy comparisons between the comparison of different sub-words of the password to corresponding sub-words of the verification word.

At Column 7, Claim No. 3, the claim should read as follows:
3. The method of claim 1, wherein the scramble control codes further cause insertion of random dummy comparisons during at least one of the random delays.

Signed and Sealed this
Twenty-seventh Day of December, 2022

Katherine Kelly Vidal
*Director of the United States Patent and Trademark Office*

At Column 7, Claim No. 5, the claim should read as follows:
5. The method of claim 1, wherein the scramble control codes are changed each time the comparison between the scrambled sub-words of the password and the scrambled sub-words of the verification word fails to indicate a match.

At Column 7, Claim No. 6, the claim should read as follows:
6. The method of claim 1, wherein the scramble control codes are changed after a given number of times the comparison between the scrambled sub-words of the password and the scrambled sub-words of the verification word indicates a match.